United States Patent [19]

Tatetsuki et al.

[11] 4,171,490

[45] Oct. 16, 1979

[54] PHOTOELECTRIC SMOKE DETECTOR

[75] Inventors: Kuniharu Tatetsuki, Sakai; Tohru Hanahara, Hirakata; Takeshi Nakano, Ibaraki; Kazushige Morisue, Owariasahi, all of Japan

[73] Assignee: Matsushita Electric Works, Ltd., Osaka, Japan

[21] Appl. No.: 846,135

[22] Filed: Oct. 27, 1977

[51] Int. Cl.[2] .............................................. G01N 21/28

[52] U.S. Cl. .................................... 250/564; 340/630

[58] Field of Search ............... 250/564, 565, 551, 573, 250/574; 340/630

[56] References Cited

U.S. PATENT DOCUMENTS 4,075,499 2/1978 Malinowski .......................... 340/630

*Primary Examiner*—M. Tokar

*Attorney, Agent, or Firm*—Burns, Doane, Swecker & Mathis

[57] ABSTRACT

A detection signal processing circuit for photoelectric smoke detectors reliably stable with respect to external noise is provided. Light receiving section of the detector for receiving light emitted intermittently from light emitting section and scattered by smoke particles comprises a light receiving element, a condenser charged depending on intermittent scattered light intensity received by the element and of a value over a predetermined level, and an output circuit providing an output to a following operation means only when charge amount of the condenser has reached a predetermined value. Optimumly, the predetermined value of the condenser charge is achieved when at least two or more of the intermittent scattered light are received continuously.

9 Claims, 7 Drawing Figures

PHOTOELECTRIC SMOKE DETECTOR

This invention relates to photoelectric smoke detectors and, more particularly, to improvements in the detectors provided with a detection signal processing circuit which is not responsive to any discontinuous external noise but is capable of operating reliably stably.

Heretofore, there have been suggested certain types of the detection signal processing circuit of the kind referred to, in one of which, such as shown in, for example, the U.S. Pat. No. 3,917,956, a flip-flop circuit employing an amplifier output as setting signal therefor and a signal synchronous to light emissions as resetting signal is provided, a timer circuit is caused to maintain its operating state with respect to any signal indicating an occurrence of smoke so as to be responsive thereto and, with respect to any external noise, the flip-flop circuit even set to be operative by a single discontinuous noise signal is reset by the synchronous signal presented next to the one synchronizing with the single noise signal so as not to respond thereto, whereby the processing circuit is made stable with respect to any external noise. According to this circuit, on the other hand, the flip-flop circuit being normally set by the signal indicative of the smoke occurrence is apt to be reset by a noise signal if such signal is superposed on the signal synchronizing with the light emissions so as to be not responsive to the presence of the smoke occurrence signal and thus to fail to make an alarm. Since the signal synchronizing with the light emissions is utilized, further, it is possible that such synchronous signal is caused to be provided to an amplifier at the prior stage to the timer circuit so as to cause a mis-operation to be thereby performed so that an extreme care must be paid to circuit designing in order to avoid such possibility.

Another example is seen in, for example, Japanese Laid-Open Patent Application No. 48-90783 (1973), in which a one-shot pulse generating circuit and a timer circuit actuated upon an operation of the one-shot pulse generating circuit are provided so that the one-shot pulse generating circuit is operated once by the input signal indicating the smoke occurrence to actuate the timer circuit so as to be responsive to the smoke occurrence, whereas, with respect to any single discontinuous noise, the timer circuit is actuated only during the generated one-shot pulse interval, and, if no following pulse is present, the charge in a time-limiting condenser in the timer circuit is caused to be discharged naturally with a timer constant larger than that for its charging so as not to reach a level enough for responding to the noise. According to this device, however, there is still involved a risk of mis-operation in such that the timer circuit is actuated in response to pulses of a less number than a predetermined signal pulse number for the normal operation of the circuit, if a noise signal next to the first incoming single noise signal is presented after the actuation of the timer circuit due to the one-shot operation as well as the charge accumulation in the time-limiting condenser and before the completion of the natural discharging of thus accumulated charge, that is, before the timer circuit is completely reset. Further, as a charging voltage for the timer-limiting condenser is employed as a source voltage of a trigger circuit of an output circuit, such source voltage is apt to be influenced by temperature variations, characteristic variations after a long time elapsed and the like, so that the operation of the detector is apt to become unstable.

The present invention has been suggested to improve the detectors of the kind referred to in respect of such problems still remained unsolved in the devices according to the prior art as described above and, according to the present invention, the problems have been effectively removed by avoiding the use of the light emission signals as the resetting signal for the detection signal processing circuit, providing a quick charging circuit for the time-limiting condenser in the timer circuit so as to establish a complete resetting of the timer circuit, and employing the charging voltage for the time-limiting condenser only for determining triggering level of the output circuit while using the circuit power source for the triggering of the output circuit.

A primary object of the present invention is to provide a detection signal process circuit of the photoelectric smoke detector wherein a predetermined period is set for discriminating actual presence or absence of smoke with respect to any input signal so that only vital signal will be detected and any mis-warning operation will be effectively avoided.

Other objects and advantages of the present invention shall be made clear upon reading the following disclosures detail with reference to certain preferred embodiments of the invention as shown in the accompanying drawings, in which.

Figure 1:
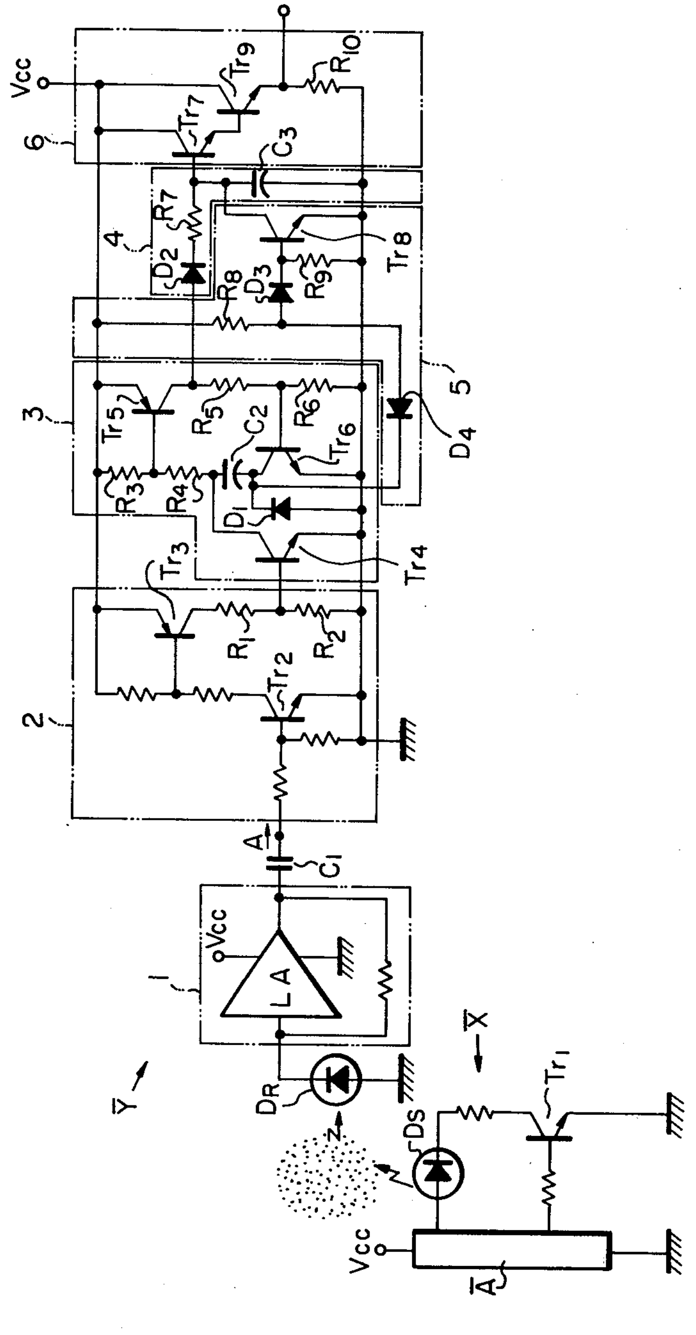
FIG. 1 is a circuit diagram showing an embodiment of a detection signal processing circuit of photoelectric smoke detector of the present invention.

Referring to FIG. 1 showing a preferred embodiment of the detection signal processing circuit of photoelectric smoke detector according to the present invention, the part indicated by $\underline{X}$ is a light emitting section and the part indicated by $\overline{Y}$ is a light receiving section. In the light emitting section $\overline{X}$, a light emitting pulse P (see FIG. 2) is generated when a transistor $Tr_1$ is conducted by a pulse signal from a pulse generating circuit $\overline{A}$ and an electric current flows to a light emission diode $D_s$.

The light receiving section $\overline{Y}$ comprises a light receiving element $D_R$, an amplifying circuit 1 for amplifying outputs from the light receiving element $D_R$, a level detecting circuit 2, a one-shot pulse generating circuit 3, a condenser charging (CR time constant) circuit 4, a discharging circuit 5 and an output circuit 6. The amplifying circuit 1 is formed of an amplifying section with a linear amplifier LA in the center so that its output will be given to the level detecting circuit 2 through a condenser $C_1$. The level detecting circuit 2 is a two stage amplifier substantially comprising transistors $Tr_2$ and $Tr_3$, output signals of which are given to the one-shot pulse generating circuit 3 from the connecting point of resistances $R_1$ and $R_2$ connected in series to the collector of the transistor $Tr_3$. The one-shot pulse generating circuit 3 substantially comprises transistors $Tr_4$, $Tr_5$ and $Tr_6$. The collector of the transistor $Tr_4$ is connected to a direct current source $V_{cc}$ through a series circuit of resistances $R_3$ and $R_4$ and the emitter is earthed. A condenser $C_2$ is inserted between an end of the resistance $R_4$ and the collector of the transistor $Tr_6$ which is earthed at the emitter. A diode $D_1$ is connected in the reverse direction between the collector and earthed side of the transistor $Tr_6$. The base of the transistor $Tr_5$ is connected to the connecting point of the resistances $R_3$ and $R_4$, the emitter is connected to the direct current source $V_{cc}$ and the collector is earthed through a series circuit of resistances $R_5$ and $R_6$. The connecting point of the resistances $R_5$ and $R_6$ is connected to the base of the transistor $Tr_6$. The collector of the transistor $Tr_5$ is connected to the base of a transistor $Tr_7$ of the output circuit 6 through a diode $D_2$ and resistance $R_7$. Further, the base of the transistor $Tr_7$ is earthed through a condenser $C_3$ and is connected to the collector of a transistor $Tr_8$. The diode $D_2$, resistance $R_7$ and condenser $C_3$ are forming the CR time constant circuit 4 which also acts as the charging circuit for the condenser $C_3$. The transistor $Tr_8$ is earthed at its emitter and also at its base through a resistance $R_9$ and is connected at the base to the direct current source $V_{cc}$ through a diode $D_3$ and resistance $R_8$. The connecting point of the resistance $R_8$ and diode $D_3$ is connected to the collector of the transistor $Tr_6$ through a diode $D_4$. The transistor $Tr_8$, resistances $R_8$ and $R_9$ and diodes $D_3$ and $D_4$ are forming the discharging circuit 5 for the condenser $C_3$. The emitter of the transistor $Tr_7$ is connected to the base of a transistor $Tr_9$ while the collector of this transistor $Tr_9$ is connected to the direct current source $V_{cc}$ and the emitter thereof is earthed through a resistance $R_{10}$. These transistors $Tr_7$ and $Tr_9$ and resistance $R_{10}$ are forming the output circuit 6.

The operation of thus arranged detection signal processing circuit according to the present invention shall be explained in the following with reference to FIGS. 2 through 5, with respect to three different states in which the circuit is waiting, smoke is occurring and noise is occurring, respectively.

I. Waiting State

Figure 2:
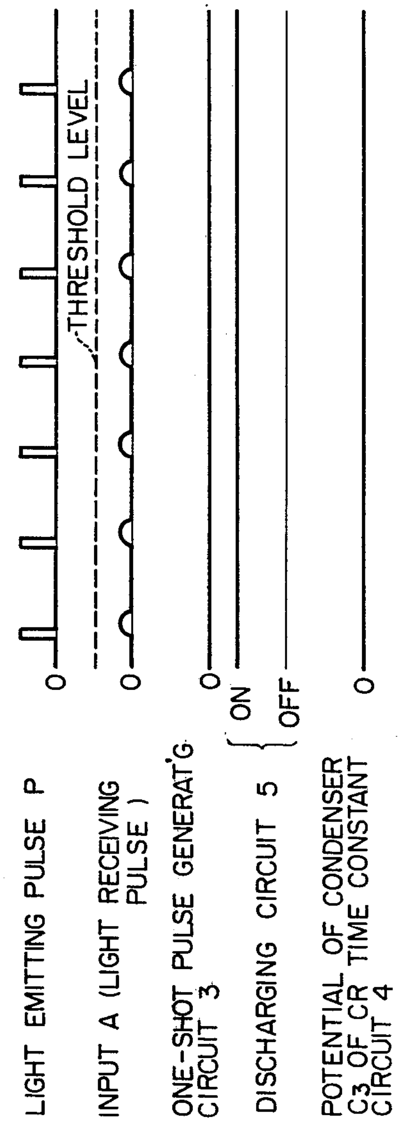
FIG. 2 is an operation chart of the circuit in FIG. 1 in its signal waiting state.

The light emitting pulse P is wave-shaped as shown by P in FIG. 2. In case no smoke enters the smoke detector, the light receiving input A will be on a low level as shown by A in FIG. 2 and, therefore, the one-shot pulse generating circuit 3 will be in waiting state. During this state of the one-shot pulse generating circuit 3 in which its output is zero, the discharging circuit 5 will be normally ON, the charge of the condenser $C_3$ of the CR time constant circuit 4 will be always discharged at a low resistance and the output of the output circuit 6 will not reach the alarming level.

II. Smoke-Occurring State

Figure 3:
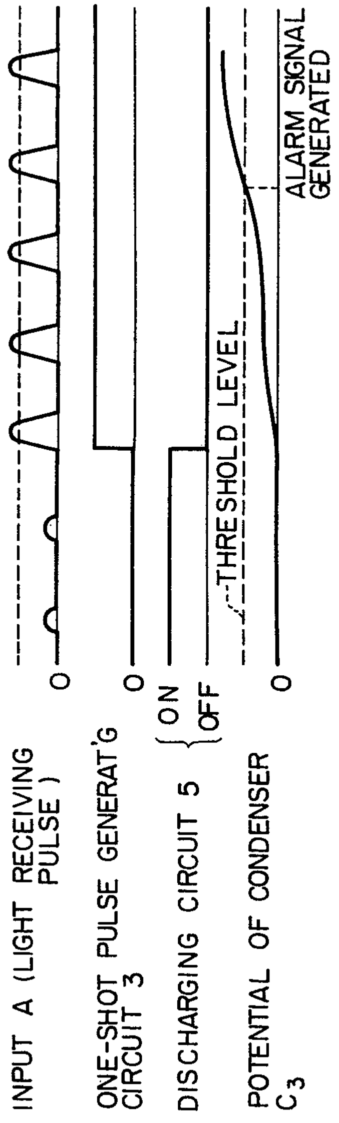
FIG. 3 is an operation chart of the circuit of FIG. 1 in a smoke-occurring state.

When smoke occurs and enters the detector, the input A to the level detecting circuit 2 will be on a high level as shown in FIG. 3 and, with the first incoming high level pulse of such input A, an output of the one-shot pulse generating circuit 3 is caused to appear so that the condenser $C_3$ in the circuit 4 will be charged. When the input pulse A disappears, the condenser $C_2$ in the circuit 3 will begin to be charged. However, the time constant of the one-shot pulse generating circuit 3 is so determined that the output of the circuit 3 will be elongated to be longer than the period until the next cycle input pulse arrives. If the second incoming pulse following the first incoming high level pulse is also on the high level, such second incoming pulse causes the one-shot pulse generating circuit 3 to further generate its output and, when the high level pulses are provided to the circuit 3 successively, the output of the one-shot pulse generating circuit 3 continues to appear. Such continuous ON state of the output of the one-shot pulse generating circuit 3 means that the discharging circuit 5 of the condenser $C_3$ in the CR time constant circuit 4 will be in OFF state and the charging circuit 4 of the condenser $C_3$ is in ON state, whereby the condenser $C_3$ is caused to continue to be gradually charged. When electric potential of thus charged condenser $C_3$ exceeds a predetermined threshold level, the output circuit 6 is caused to provide an output for generating, for example, an alarming signal of smoke or fire occurrence. It is preferable that such alarming output of the circuit 6 takes place upon presence of at least the second incoming high level pulse.

III. Noise-Occurring State

The circuit according to the present invention is adapted to be discriminative to respective two different types of the noise-occurring state, in one of which the noise occurs discontinuously and in the other of which it occurs continuously. References shall be made to the respective types of the noise-occurring state.

Figure 4:
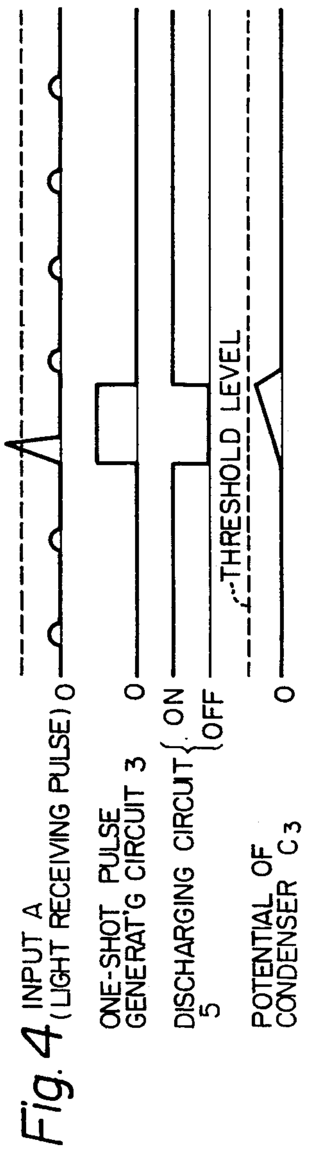
FIG. 4 is an operation chart of the circuit of FIG. 1 in a state of discontinuous noise occurrence.

(a) Discontinuous Noise Occurrence:

When such noise as shown by an input N in FIG. 4 occurs, the output of the one-shot pulse generating circuit 3 will continue to be ON for a period so set that the output level of the circuit 3 still does not reach the threshold level for generating the alarming signal only with the first incoming pulse or a single high level pulse give to the level detecting circuit 2. After the lapse of that period, the output of the one-shot pulse generating circuit 3 will be OFF, then the discharging circuit 5 will work so that the output of the output circuit 6 will not reach the alarming level.

Figure 5:
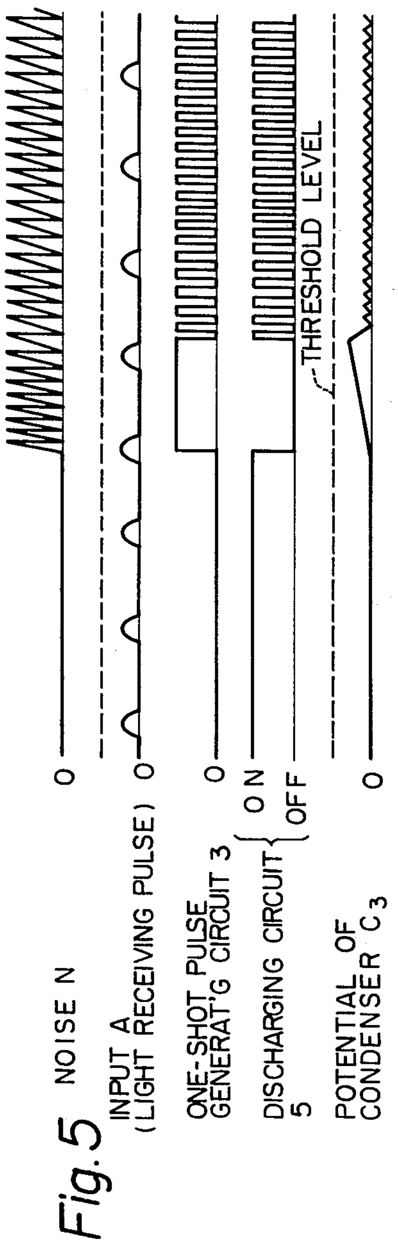
FIG. 5 is an operation chart of the circuit of FIG. 1 in a state of continuous noise occurrence.

(b) Continuous Noise Occurrence:

When a continuous noise input N as shown in FIG. 5 occurs and is provided to the transistors $Tr_5$ and $Tr_6$ of the one-shot pulse generating circuit 3, the circuit 3 will be ON for the set period before described and will be OFF after the lapse of that period. Even when the circuit 3 is made OFF, however, there is presented no discharging circuit for the charge of the condenser $C_2$ in the circuit 3 so that, even when the circuit 3 is made ON again by still incoming noise, such ON state of the circuit 3 will be retained only for a time during which the condenser $C_2$ is charged only by an amount of its leakage and will be interrupted immediately after that time, and this state is repeated as long as the noise continues. With such intermittent ON and OFF operation of the circuit 3, the discharging circuit 5 for the condenser $C_3$ in the CR time constant circuit 4 will also work only intermittently, so that the potential of the condenser $C_3$ will not rise to the level of causing the output circuit 6 to provide the output for signalling the alarm.

Thus, in the detection signal processing circuit according to the present invention, the presence of the output of the one-shot pulse generating circuit 3 causes the discharging circuit 5 to be OFF whereas the absence of the output of the circuit 3 causes the discharging circuit 5 to be ON, whereby the integrating circuit is reset and the charging circuit is made OFF so that no charging operation will be performed. Accordingly, once the one-shot pulse generating circuit 3 is made ON, the circuit will retain its ON state until the next light receiving pulse arrives and, with several following pulses, the output circuit 6 is driven to issue the alarm signal. In other words, the signal processing circuit according to the present invention is capable of detecting only inherent signals generated by smoke at the time of a fire to generate a fire alarming signal without responding to any external noise so that the reliability of the smoke detector can be made high.

Figure 6:
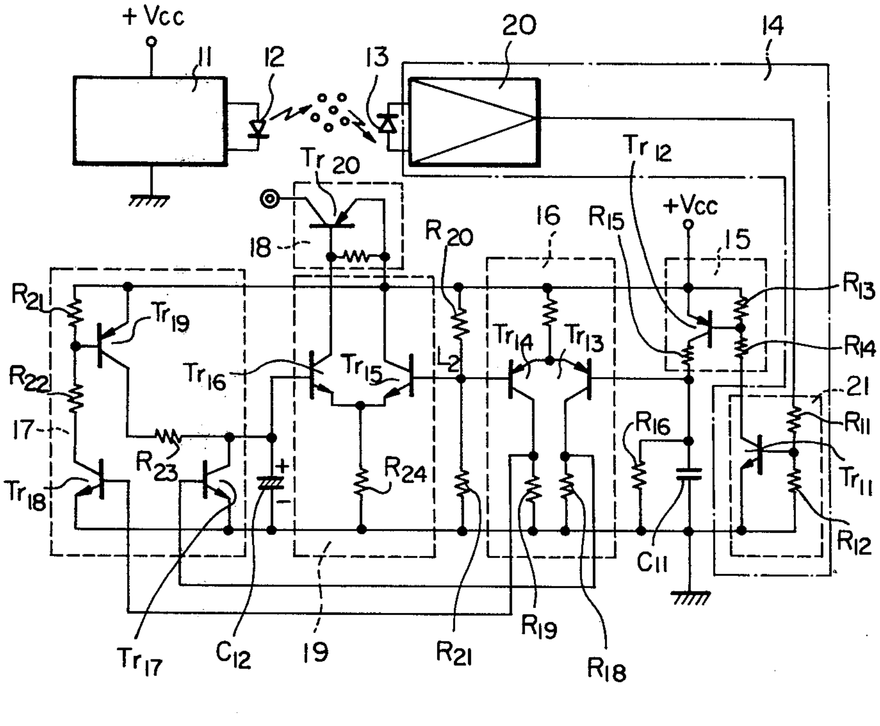
FIG. 6 is a circuit diagram showing another embodiment of the present invention.

Referring now to FIG. 6 showing another embodiment of the circuit of the present invention, the light emitting section comprises a pulse generating circuit 11 for periodically generating light emitting pulses and a light emitting element 12 responsive to the pulse, and the light receiving section comprises a light receiving element 13, a detecting section 14 formed of an amplifier 20 and level detector 21, a pulse charging section 15 receiving outputs of the detecting section 14, a first differential comparator 16, a second differential comparator 19, a charging and discharging circuit 17 and a driving circuit 18.

Figure 7:
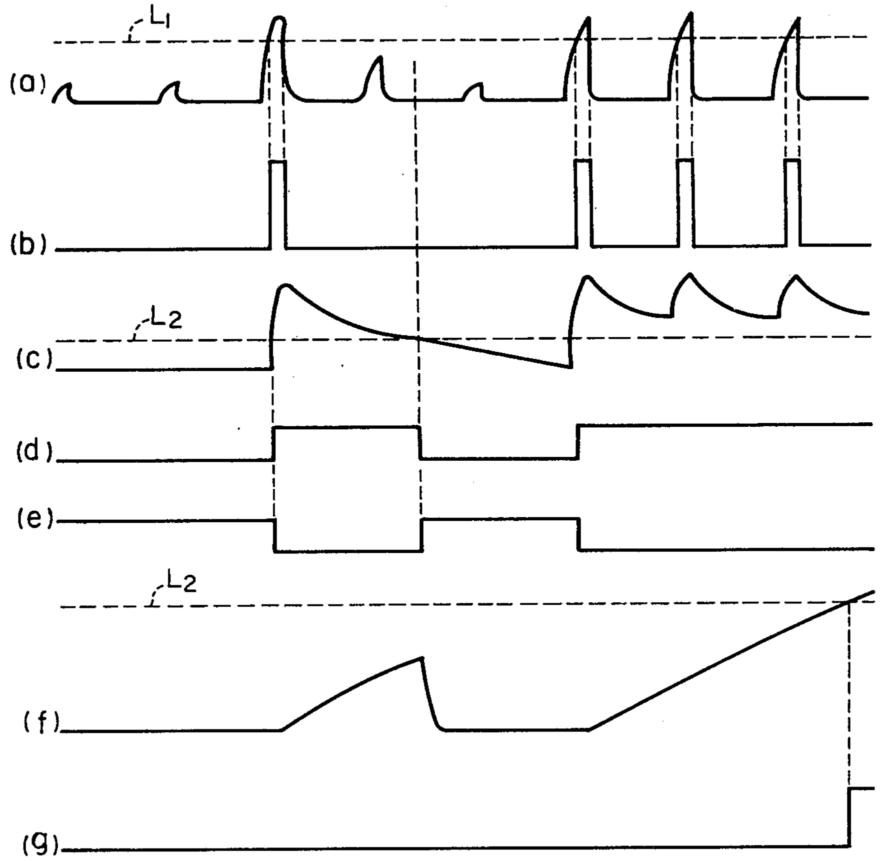
FIG. 7 is an operation chart of the embodiment of FIG. 6.

Referring more particularly to the light receiving section, an output from the amplifier 20 responsive to light receiving pulse from the element 13 is given to a series circuit of resistances $R_{11}$ and $R_{12}$, the connecting point of these resistances is connected to the base of a transistor $Tr_{11}$ of which the emitter is earthed and the collector is connected to a direct current source $V_{cc}$ through a series circuit of resistances $R_{13}$ and $R_{14}$, a transistor $Tr_{12}$ is connected at the emitter to the direct current source $V_{cc}$, at the base to the connecting point of the resistances $R_{13}$ and $R_{14}$ and at the collector to the earth through a resistance $R_{15}$ and a parallel circuit of a condenser $C_{11}$ and resistance $R_{16}$. In the pulse charging section 15, an output pulse signal of the level detecting circuit 21 conducts the transistor $Tr_{12}$ to quickly charge the condenser $C_{11}$ and, until the next pulse comes in, the charge of the thus charged condenser $C_{11}$ is discharged with the time constant determined by the condenser $C_{11}$ and resistance $R_{16}$ through the resistance $R_{16}$ (see diagram (c) of FIG. 7). The period in which the output voltage of the pulse charging section 15 is maintained to be above a comparing and detecting level $L_2$ set in the first differential comparator 16 in the next step is made the same as or longer than the pulse generating interval of the pulse generating circuit 11.

In the first differential comparator 16, the emitters of transistors $Tr_{13}$ and $Tr_{14}$ are connected to the direct current source $V_{cc}$ through a common-mode biasing resistance $R_{17}$ connected to the respective emitters of these transistors and are earthed at their collectors through resistances $R_{18}$ and $R_{19}$, respectively. This first differential comparator 16 compares the output voltage of the pulse charging section 15 with the comparing and detecting level $L_2$ determined by resistances $R_{20}$ and $R_{21}$ so that, when an output voltage of the pulse charging part 15 exceeding the level $L_2$ is detected by the comparator 16, the collector voltage of the transistor $Tr_{13}$ will become smaller than the collector voltage of the transistor $Tr_{14}$ and, when the output voltage of the pulse charging section 15 is below the level $L_2$, the collector voltage of the transistor $Tr_{13}$ will become larger than the collector voltage of the transistor $Tr_{14}$ (see diagrams (d) and (e) of FIG. 7).

In the charging and discharging circuit 17 substantially comprising transistors $Tr_{17}$, $Tr_{18}$ and $Tr_{19}$, the transistor $Tr_{18}$ is connected at the collector to the direct current source $V_{cc}$ through series connected resistances $R_{21}$ and $R_{22}$ and is earthed at the emitter while the base is connected to the collector of the transistor $Tr_{14}$ in the first differential comparator 16. The transistor $Tr_{19}$ is connected at the emitter to the direct current source $V_{cc}$, at the base to the connecting point of the resistances $R_{21}$ and $R_{22}$ and at the collector to an end of a condenser $C_{12}$ through a resistance $R_{23}$. The condenser $C_{12}$ is earthed at the other end. The transistor $Tr_{17}$ is connected at the collector to the condenser $C_{12}$ on its unearthed side, at the emitter to the earth and at the base to the collector of the transistor $Tr_{13}$ in the first differential comparator 16. This charging and discharging circuit 17 is so arranged that the collector voltages of the transistors $Tr_{13}$ and $Tr_{14}$ of the first differential compartor 16 will be received and, when the collector voltage of the transistor $Tr_{13}$ is lower than the collector voltage of the transistor $Tr_{14}$, the condenser $C_{12}$ will be charged comparatively slowly and, when the collector voltage of the transistor $Tr_{13}$ is higher than the collector voltage of the transistor $T_{14}$, the charge in the condenser $C_{12}$ will be quickly discharged.

In the second differential comparator 19 which substantially comprising transistors $Tr_{15}$ and $Tr_{16}$, the emitters of the transistors $Tr_{15}$ and $Tr_{16}$ are earthed through a common-mode biasing resistance $R_{24}$, the transistor $Tr_{16}$ is connected at the base to the unearthed side terminal of the condenser $C_{12}$ and at the collector to the base of a transistor $Tr_{20}$ which forming the driving circuit 18, while the transistor $Tr_{15}$ is connected at the base to connecting point of series connected resistances $R_{20}$ and $R_{21}$ and at the collector to the direct current source $V_{cc}$. In order to reduce the number of component parts, in the second differential comparator 19, the terminal voltage of the condenser $C_{12}$ is compared by using the same comparing and detecting level $L_2$ (which needs not be always the same inherently) as of the first differential comparator 16 as a reference level. For example, as shown by a diagram (f) in FIG. 6, when three light receiving pulses are received and the voltage across the condenser $C_{12}$ reaches the comparing and detecting level $L_2$, the driving circuit 18 will be driven to produce an output signal shown by a diagram (g) in FIG. 7.

According to the present invention, as has been described, the input pulse signal is elongated to be of a fixed width and no pulse but a fixed direct current voltage is applied to the condenser $C_{12}$ so that, with only one of the one-shot output signals, the charge of the condenser will not be completed so as not to rise to a fixed level but, with at least two or more one-shot outputs, the potential of the condenser $C_{12}$ will reach the detecting level $L_2$, whereby any mis-operation responsive to a single shot signal is effectively prevented from occurring.

In the present invention, further, the first differential comparator having detected the voltage with which the condenser $C_{11}$ is pulse-charged is determined to have a time constant for the discharge of the condenser so as to maintain the same state at least for a period longer than the pulse interval of the periodical pulse driving part.

What is claimed is:

1. In a photoelectric smoke detector wherein light emitted from a light source driven by a light emitting pulse circuit and scattered by smoke particles is received by a light receiving element and variations in electric current output of said light receiving element due to variations in received amount of light at said light receiving element are detected by a switching circuit, a detection signal processing circuit for such photoelectric smoke detector comprising a one-shot pulse generating circuit which is turned ON upon actuation of the light receiving element to generate one output pulse, a charging circuit for charging a condenser with the output signal of said one-shot pulse generating circuit, and a discharging circuit for discharging the charge of said condenser, the arrangement being such that, when said one-shot pulse generating circuit is ON, said charging circuit will be ON and said discharging circuit will be OFF and, when the one-shot pulse generating circuit is OFF, the charging circuit will be OFF and the discharging circuit will be ON.

2. A detection signal processing circuit according to claim 1 wherein said condenser has a time constant such that, when said one-shot pulse generating circuit generates at least two successive pulses, the terminal voltage of the condenser reach a predetermined value.

3. A detection signal processing circuit according to claim 1 which further comprises an output circuit which is actuated when the terminal voltage of said condenser reaches a predetermined value.

4. A detection signal processing circuit according to claim 1 which further comprises a level detecting means which amplifies the output signal from said light receiving element and provides an output to said one-shot pulse generating circuit when the output of the element reaches a predetermined level and is detected by said means.

5. A detection signal processing circuit of photoelectric smoke detector, which comprising a light source emitting light in response to light emitting pulses, a light receiving element receiving said light as scattered by smoke particles, a level detecting means for detecting an amplified output from said light receiving element, a pulse charging means to be charged by said output detected by said level detecting means, a first differential comparator to be reversed when it detects an output voltage of said pulse charging means, a charging and discharging circuit which performs a charging operation when the output of said first differential comparator turns reverse and a quick discharging operation when said output turns normal, a second differential comparator which compares outputs of said charging and discharging circuit with a predetermined level, and a driving circuit receiving an output of said second differential comparator provided when said predetermined level is reached for driving an associated operation device.

6. A photoelectric smoke detector which comprises a light emitting section intermittently emitting light and a light receiving section for receiving intermittent scattered light of the emitted light as reflected from smoke particles, said light receiving section comprising a light receiving element, a level detecting circuit connected to said light receiving element for detecting intensity level of the intermittent scattered light received by the element, a one-shot pulse generating circuit operated in response to an output of said level detecting circuit, a first condenser earthed at one end and connected at the other end through a series circuit of a first resistance and a first diode to output end of said one-shot pulse generating circuit, said condenser being charged depending on intensity of said intermittent scattered light received by the light receiving element and of a value over a predetermined level, and an output circuit providing an output to an associated operation means only when charge amount in said first condenser has reached a predetermined value; said light receiving section including a first transistor connected at the emitter to said earthed end of the first condenser, at the collector to said the other end of the first condenser and at the base to a direct current source through a series circuit of a second diode and a second resistance and earthed at the base through a third resistance, and said one-shot pulse generating circuit comprising a second transistor connected at the base to the output end of said level detecting circuit and at the collector to said direct current source through a series circuit of fourth and fifth resistances and earthed at the emitter, a third transistor connected at the base to connecting point of said fourth and fifth resistances, at the emitter to the direct current source and at the collector to the condenser through said series circuit of the first diode and first resistance and earthed at the collector through a series circuit of sixth and seventh resistances, and a fourth transistor connected at the base to connecting point of said sixth and seventh resistances, earthed at the emitter and connected at the collector to the collector of said second transistor through a second condenser, the collector of said fourth transistor being further earthed through a third diode and connected to the direct current source through a series circuit of a fourth diode and said second resistance.

7. A detector according to claim 6 wherein said level detecting circuit comprises a fifth transistor earthed at the emitter and connected at the base to output end of said light receiving element and at the collector to the direct current source through a series circuit of eighth and ninth resistances, and a sixth transistor connected at the base to connecting point of said eighth and ninth resistances and at the emitter to the direct current source and earthed at the collector through a series circuit of tenth and eleventh resistances, connecting point of said tenth and eleventh resistances being connected to the base of said second transistor of the one-shot pulse generating circuit.

8. A detector according to claim 7 wherein said output circuit comprises a seventh transistor connected at the base to said one end of the condenser and at the collector to the direct current source, and an eighth transistor connected at the base to the emitter of said seventh transistor and at the collector to the direct current source and earthed at the emitter through a twelfth resistance, the emitter of said eighth transistor being connected to said associated operation means.

9. A detector according to claim 6 wherein said one-shot pulse generating circuit comprises a ninth transistor connected at the base to output end of the level detecting circuit and at the emitter to the direct current source and earthed at the collector through a series circuit of thirteenth and fourteenth resistances, a third condenser connected at one end to connecting point of said thirteenth and fourteenth resistances and earthed at the other end, and a first differential amplifier connected at a first input end to connecting point of said thirteenth and fourteenth resistances and at a second input end to the direct current source through a fifteenth resistance, said second input end being earthed through a sixteenth resistance, said first differential amplifier performs the charging of said first condenser with an output which the amplifier provides at its second output end and is larger than an output provide at its first output end when an input presented to said first input end is larger than that presented to said second input end and a discharging of the first condenser upon an output which the amplifier provides at the first output end and is larger than an output provided at the second output end when the input presented to the first input end is smaller than that presented to the second input end.

* * * * *